United States Patent
Johnson et al.

(10) Patent No.: US 11,060,745 B1
(45) Date of Patent: *Jul. 13, 2021

(54) ENERGY REDUCTION

(71) Applicant: Alarm.com Incorporated, Tysons, VA (US)

(72) Inventors: Kyle Rankin Johnson, Arlington, VA (US); Caspar John Anderegg, McLean, VA (US)

(73) Assignee: Alarm.com Incorporated, Tysons, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/600,072

(22) Filed: Oct. 11, 2019

Related U.S. Application Data

(63) Continuation of application No. 15/423,206, filed on Feb. 2, 2017, now Pat. No. 10,443,873.

(60) Provisional application No. 62/290,783, filed on Feb. 3, 2016.

(51) Int. Cl.
  *F24F 11/30* (2018.01)
  *F24F 11/62* (2018.01)
  *G05B 13/04* (2006.01)
  *F24F 11/65* (2018.01)
  *F24F 11/46* (2018.01)

(52) U.S. Cl.
  CPC ............ *F24F 11/30* (2018.01); *F24F 11/62* (2018.01); *G05B 13/041* (2013.01); *F24F 11/46* (2018.01); *F24F 11/65* (2018.01); *G05B 2219/2614* (2013.01)

(58) Field of Classification Search
  None
  See application file for complete search history.

(56) References Cited

U.S. PATENT DOCUMENTS

| | | |
|---|---|---|
| 5,454,511 A | 10/1995 | Van Ostrand et al. |
| 6,006,142 A | 12/1999 | Seem |
| 6,196,468 B1 | 3/2001 | Young |
| 6,628,997 B1 | 9/2003 | Fox et al. |
| 7,861,941 B2 | 1/2011 | Schultz et al. |
| 8,136,738 B1 | 3/2012 | Kopp |
| 8,359,124 B2 | 1/2013 | Zhou et al. |
| 9,618,225 B2 | 4/2017 | Rylski et al. |
| 9,945,574 B1 | 4/2018 | Sloo |
| 10,001,789 B2 | 6/2018 | Hunka |
| 2005/0090915 A1 | 4/2005 | Geiwitz |

(Continued)

*Primary Examiner* — Carlos R Ortiz Rodriguez
(74) *Attorney, Agent, or Firm* — Fish & Richardson P.C.

(57) ABSTRACT

Methods, systems, and apparatus, including computer programs encoded on a computer storage medium, for energy reduction are disclosed. In one aspect, a method includes the actions of receiving data from a thermostat, an HVAC system, and one or more temperature sensors associated with a property. The actions further include generating an HVAC performance model based on the received data from the thermostat, the HVAC system, and the one or more temperature sensors associated with the property. The actions further include receiving user data indicating user presence and user preferences. The actions further include identifying an energy penalty score. The actions further include receiving weather data. The actions further include creating an energy routine based on the HVAC performance model, the user data, the identified energy penalty score, and the received weather data. The actions further include transmitting an instruction including the energy routine to one or more devices.

20 Claims, 9 Drawing Sheets

(56) References Cited

U.S. PATENT DOCUMENTS

| | | |
|---|---|---|
| 2007/0210177 A1 | 9/2007 | Karasek |
| 2009/0171506 A1 | 7/2009 | Donaldson |
| 2010/0084482 A1 | 4/2010 | Kennedy et al. |
| 2012/0048955 A1 | 3/2012 | Lin et al. |
| 2012/0261079 A1 | 10/2012 | Chambers |
| 2014/0058567 A1 | 2/2014 | Matsuoka et al. |
| 2014/0135998 A1 | 5/2014 | Cao |
| 2014/0316584 A1 | 10/2014 | Matsuoka et al. |
| 2015/0168933 A1 | 6/2015 | Klein et al. |
| 2016/0341435 A1 | 11/2016 | Rabb |
| 2017/0205105 A1 | 7/2017 | Adam |

ENERGY REDUCTION

CROSS-REFERENCE TO RELATED APPLICATION

This application is a continuation of U.S. application Ser. No. 15/423,206, filed Feb. 2, 2017, which claims the benefit of U.S. Patent Application No. 62/290,783, filed Feb. 3, 2016. Both of these prior applications are incorporated by reference in their entirety.

TECHNICAL FIELD

This disclosure relates to monitoring technology and, for example, HVAC systems.

BACKGROUND

Heating, ventilating and air conditioning (HVAC) units may perform cooling functions by using a refrigeration cycle to remove heat from air that is circulated over evaporator coils, and heating functions by using a furnace to heat air from a source vent and blowing the heated air through return vents.

SUMMARY

Techniques are described for generating personalized energy management schedules for efficient operation of an HVAC system associated with a property. For instance, a data aggregation framework may initially be used to generate a HVAC performance model by combining data generated by components of a HVAC system, and exterior and interior temperature information of the property. The HVAC performance model estimates energy consumption associated with subsequent HVAC operation given the historical data associated with the HVAC system. In some instances, energy tariffs that are charged by energy providers during peak pricing periods may also be determined. After identifying the energy tariffs, estimations from the HVAC performance model may be used to automatically generate a personalized energy management schedule that either prioritizes user comfort, energy efficiency, or a combination of the two factors. In some instances, user activity data that indicates user presence within the property and a set of user preferences for comfort and/or energy efficiency is also used to generate the personalized energy management schedule. In this regard, the personalized energy management schedules may be used to both accommodate a set of user preferences relating to comfort while maintaining an energy efficient operation of a HVAC system.

According to an innovative aspect of the subject matter described in this application, a method for energy reduction includes the actions of receiving data from a thermostat, an HVAC system, and one or more temperature sensors associated with a property; generating an HVAC performance model based on the received data from the thermostat, the HVAC system, and the one or more temperature sensors associated with the property; receiving user data indicating user presence and user preferences associated with the property; identifying an energy penalty score based on energy usage within the property; receiving weather data associated with a location of the property; creating an energy routine based on the HVAC performance model, the user data, the identified energy penalty score, and the received weather data; and transmitting an instruction including the energy routine to one or more devices.

These and other implementations can each optionally include one or more of the following features. The received data from the HVAC system includes HVAC load and HVAC energy consumption. The received data from the one or more temperature sensors associated with the property includes interior temperature data from one or more interior sensors and temperature data from one or more exterior sensors. The HVAC performance model is a linear model that approximates subsequent HVAC performance based on one or more HVAC parameters that impact HVAC operation. The one or more HVAC parameters that impact HVAC operation include interior temperature, exterior temperature, and thermostat set temperature. The user data indicating user presence comprises data indicating whether the property is presently occupied by one or more users and a location within the property where the one or more users are located. The user data indicating user presence comprises occupancy prediction data based on historical data indicating time periods when the property was occupied by one or more users and locations within the property where the one or more users were located. The energy penalty score is based on an energy cost during one or more periods of time during a day. The energy routine is configured to minimize energy costs associated with HVAC operation.

Other embodiments of this aspect include corresponding systems, apparatus, and computer programs recorded on computer storage devices, each configured to perform the operations of the methods.

The subject matter described in this application may have one or more of the following advantages. A computing device may be configured to improve performance and service life of an HVAC system by reducing the load on the HVAC system and/or reducing a number of times that the HVAC system cycles on and off. The computing device may be configured to access sensors from around a property to learn and predict user habits and operate the HVAC system accordingly.

The details of one or more embodiments of the subject matter described in this specification are set forth in the accompanying drawings and the description below. Other features, aspects, and advantages of the subject matter will become apparent from the description, the drawings, and the claims.

DETAILED DESCRIPTION

Figure 1:
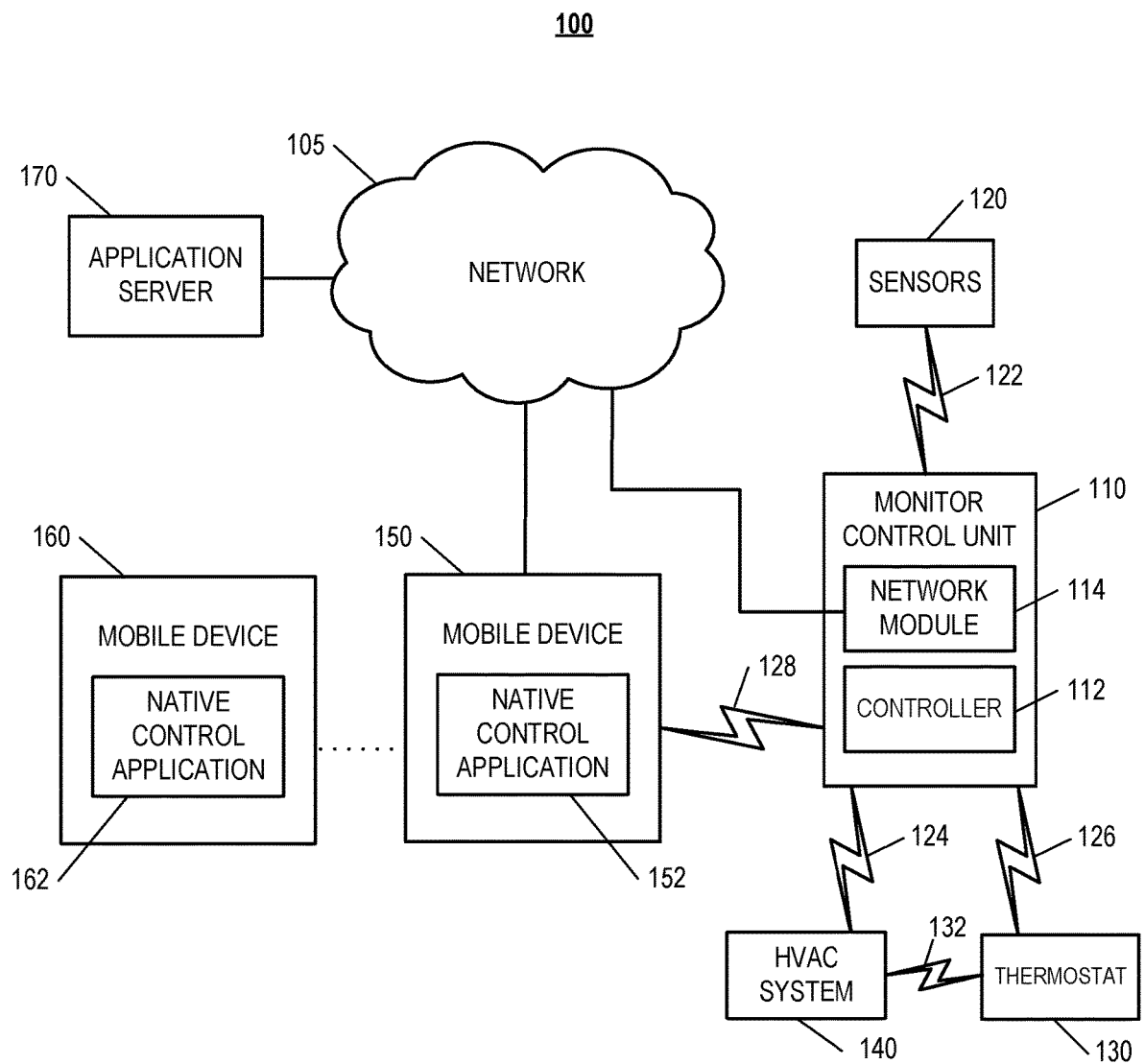
FIG. 1 illustrates a diagram of an example of a system.

FIG. 1 illustrates a diagram of an example of a monitoring system 100 configured to generate personalized energy management schedules. The system 100 may include a monitor control unit 110, sensors 120, thermostat 130, HVAC system 140, one or more user devices 150, 160, and an application server 170 connected over a network 105.

In general, the system 100 can be configured to monitor and adjust the operation of the HVAC system 140 based on monitoring, analyzing, and aggregating various types of data generated by devices within the property. As an example, the various types of data may include user input data indicating user preferences related to temperature within the property from the thermostat 130, presence data associated with a user's presence within the property from occupancy sensors placed in different locations of the property, weather forecast data indicating exterior conditions outside the property from a third-party weather forecasting organization, energy consumption data associated with the HVAC system 140, and energy pricing data such as energy tariffs associated with energy consumption within the property from the energy provider for the property. Using such various types of data, the system 100 can use data analytical and trend analysis techniques (e.g., machine learning, pattern recognition, heuristic analysis, etc.) to generate an HVAC performance model that estimates subsequent HVAC performance for various types of conditions based on prior activity data for the HVAC system 140.

In addition to generating the HVAC performance model, the system 100 may adjust the operation of the HVAC system 140 based on creating a personalized energy management schedule that designates how the HVAC system 140 should be subsequently operated. For instance, the system 100 may create the personalized energy management schedule based on analyzing prior energy consumption data indicated by the HVAC performance model, and preemptively adjust the operation of the HVAC system 140 using the personalized energy management schedule to reduce energy consumption while also maintaining comfort settings provided by the user. For example, as depicted more particularly with respect to FIGS. 2, 3A, 3B, 4, 5A, 5B, and 6-6, the personalized energy management schedule specifies optimal time periods of HVAC operation (e.g., cooling or heating periods) based on an exterior temperature of the property, an interior temperature of the property, a desired temperature configured by the user on the thermostat 130, and/or energy pricing information indicating peak energy pricing periods (e.g. 2 PM-5:30 PM). FIGS. 2, 3A, 3B, 4, 5A, 5B, and 6 depict examples of schedule templates for different modes of operation of the HVAC system 140 based on the information indicated by the HVAC performance model. More particular descriptions related to the components of the system 100 are provided below.

The network 105 may be configured to enable exchange of electronic communications between the monitor control unit 110, the sensors 120, the thermostat 130, the HVAC system 140, the one or more mobile devices 150, 160, and the application server 170. The network 105 may include, for example, one or more of the Internet, Wide Area Networks (WANs), Local Area Networks (LANs), analog or digital wired and wireless telephone networks (e.g., a public switched telephone network (PSTN), Integrated Services Digital Network (ISDN), a cellular network, and Digital Subscriber Line (DSL)), radio, television, cable, satellite, or any other delivery or tunneling mechanism for carrying data. The network 105 may include multiple networks or subnetworks, each of which may include, for example, a wired or wireless data pathway. The network 105 may also include a circuit-switched network, a packet-switched data network, or any other network able to carry electronic communications (e.g., data or voice communications). For example, the network 105 may include networks based on the Internet protocol (IP), asynchronous transfer mode (ATM), the PSTN, packet-switched networks based on IP, X.25, or Frame Relay, or other comparable technologies and may support voice using, for example, VoIP, or other comparable protocols used for voice communications. The network 105 may include one or more networks that include wireless data channels and wireless voice channels. The network 105 may be a wireless network, a broadband network, or a combination of networks including a wireless network and a broadband network.

The monitor control unit 110 includes a controller 112 and a network module 114. The controller 112 is configured to control a system, e.g., an HVAC system associated with a property, that includes the monitor control unit 110. In some examples, the controller 112 can include a processor or other control circuitry configured to execute instructions of a program that controls operation of an HVAC system. In these examples, the controller 112 can be configured to receive input from sensors, detectors, or other devices associated with the HVAC system and control operation of components of the HVAC system, e.g., a furnace, humidifier, dehumidifier, or air conditioner, or other devices associated with the property, e.g., an appliance, lights, etc. For example, the controller 112 can be configured to control operation of the network module 114 included in the monitor control unit 110.

The network module 114 is a communication device configured to exchange communications over the network 105. The network module 114 may be a wireless communication module configured to exchange wireless communications over the network 105. For example, the network module 114 may be a wireless communication device configured to exchange communications over a wireless data channel and a wireless voice channel. In this example, the network module 114 may transmit alarm data over a wireless data channel and establish a two-way voice communication session over a wireless voice channel. The wireless communication device may include one or more of a LTE module, a GSM module, a radio modem, cellular transmission module, or any type of module configured to exchange communications in one of the following formats: LTE, GSM or GPRS, CDMA, EDGE or EGPRS, EV-DO or EVDO, UMTS, or IP.

The network module 114 may also be a wired communication module configured to exchange communications over the network 105 using a wired connection. For instance, the network module 114 may be a modem, a network interface card, or another type of network interface device. The network module 114 may be an Ethernet network card configured to enable the monitor control unit 110 to communicate over a local area network and/or the Internet. The network module 114 also may be a voice-band modem configured to enable the alarm panel to communicate over the telephone lines of Plain Old Telephone Systems (POTS).

The monitor control unit 110 communicates with the sensors 120, the thermostat 130, and the HVAC system 140 to perform dynamic environmental control at the property.

For instance, the monitor control unit 110 is configured to exchange communications with the sensors 120 that monitor temperature and/or energy consumption of the HVAC system 140 associated with the thermostat 130, and is further configured to provide control of the thermostat 130. In some implementations, the monitor control unit 110 can additionally or alternatively receive data relating to activity at a property and/or environmental data at a property, e.g., at various locations indoors and outdoors at the property. The monitor control unit 110 can directly measure energy consumption of the HVAC system 140 associated with the thermostat 130, or can estimate energy consumption of the HVAC system 140 associated with the thermostat 130, for example, based on detected usage of one or more components of the HVAC system 140 associated with the thermostat 130. The monitor control unit 110 can communicate temperature and/or energy monitoring information to or from the sensors 120 and can control the operation of the thermostat 130 and the HVAC system 140 based on commands the temperature and/or energy monitoring information.

The monitor control unit 110 also may include communication modules 122, 124, 126, and 128 that enables the monitor control unit 110 to communicate other devices of the system 100. The communication modules 122, 124, 126, and 128 may be wireless communication modules that allow the monitor control unit 110 to communicate wirelessly. For instance, the communication modules 122, 124, 126, and 128 may be Wi-Fi modules that enables the monitor control unit 110 to communicate over a local wireless network at the property. The communication modules 122, 124, 126, and 128 may further may be 900 MHz wireless communication modules that enables the monitor control unit 110 to communicate directly with a monitoring system control unit. Other types of short-range wireless communication protocols, such as Bluetooth, Bluetooth LE, Zwave, ZigBee, etc., may be used to allow the monitor control unit 110 to communicate with other devices in the property.

The monitor control unit 110 further may include processor and storage capabilities. The monitor control unit 110 may include any suitable processing devices that enable the monitor control unit 110 to operate applications and perform the actions described throughout this disclosure. In addition, the monitor control unit 110 may include solid state electronic storage that enables the monitor control unit 110 to store applications, configuration data, collected sensor data, and/or any other type of information available to the monitor control unit 110.

In some implementations, the monitor control unit 110 may monitor the operation of the sensors 120, the thermostat 130, or the HVAC system 140. For instance, the monitor control unit 110 may enable or disable the sensors 120, the thermostat 130, or the HVAC system 140 based on a set of rules associated with energy consumption, user-specified settings (e.g., user preferences indicated by a user-defined desired temperature for the thermostat 130), user occupancy information within the property, and/or other information associated with the conditions near or within the property where the system 100 is located (e.g., interior temperature, exterior temperature, etc.).

The system 100 also includes one or more sensors or detectors. For example, the monitoring system may include multiple sensors 120. The sensors 120 may include one or more of a contact sensor, a motion sensor, an occupancy sensor, or any other type of sensor included in a property monitoring system (e.g., the HVAC system 140). The sensors 120 also may also include environmental sensors, such as temperature sensors, humidity sensors, noise sensors, light sensors, air quality sensors, smoke detectors, carbon monoxide detectors, water sensors, rain sensors, wind sensors, etc. In some examples, the sensors 120 may include a radio-frequency identification (RFID) sensor that identifies a particular article that includes a pre-assigned RFID tag. The sensors 120 can also include sensors that monitor activity within or near the property and communicate the activity data collected by the sensors 120 indicating environmental conditions at various locations within the property (e.g., front door, backyard, etc.) to the monitor control unit.

The thermostat 130 may be a dynamically programmable thermostat that is integrated with the monitor control unit 110. For instance, the thermostat 130 may be an internal component to a temperature monitoring system that operates as a gateway device that receives user input indicating a desired temperature that is then transmitted to the monitor control unit 110 and/or the HVAC system 140. In some implementations, the thermostat 130 may also be used to receive data indicating a set of user preferences related to energy consumption of the HVAC system 140 or temperature comfort within the property. For example, the thermostat 130 may be used to control the interior temperature of the property based on a set of programmable operations based on the data indicating the set of user preferences.

The HVAC system 140 may be a control system within the property that includes one or more components that perform operations related to thermal comfort, ventilation, indoor air quality and infiltration monitoring, and/or pressure maintenance. In some implementations, the HVAC system 140 is also configured to monitor energy consumption of individual system components, for example, by directly measuring the energy consumption of the HVAC system components or by estimating the energy usage of the one or more HVAC system components based on detecting usage of components of the HVAC system 140. For instance, the HVAC system 140 can communicate energy monitoring information and the state of the HVAC components to the monitor control unit 110, which can then transmit control signals to the HVAC system 140 to adjust the operation of the one or more components of the HVAC system 140 based on aggregating energy monitoring information and the state of the HVAC components with the data collected by the sensors 120 and the thermostat 130.

In some implementations, the HVAC system 140 can communicate directly with the monitor control unit 110. For example, the monitor control unit 110 can transmit control signals to the HVAC system 140 to send and/or receive information related to controlling the components of the HVAC components, information relating to the energy usage of the HVAC components, or other information. In some instances, the thermostat 130 can communicate information to the monitor control unit 110, and the monitor control unit 110 can communicate the information received from the thermostat 130 to the HVAC system 140.

The one or more mobile devices 150, 160 are devices that host one or more native applications, e.g., the native applications 152, 162. The one or more mobile devices 150, 160 can be cellular phones or non-cellular locally networked devices. The one or more mobile devices 150, 160 can include a cell phone, a smart phone, a tablet PC, a personal digital assistant ("PDA"), or any other portable device configured to communicate over a network. For example, implementations also can include Blackberry-type devices, e.g., as provided by Research in Motion, electronic organizers, iPhone-type devices, e.g., as provided by Apple, iPod devices, e.g., as provided by Apple, or other portable music players, other communication devices, and handheld or portable electronic devices for gaming, communications, and/or data organization. The one or more mobile devices 150, 160 can be the same or can include mobile devices of different types. The one or more mobile devices 150, 160 can perform functions unrelated to the control system, such as placing personal telephone calls, playing music, playing video, displaying pictures, browsing the Internet, maintaining an electronic calendar, etc.

In some implementations, the one or more mobile devices 150, 160 communicate with and receive control system data from the monitor control unit 110 using the communication link 138. For instance, the one or more mobile devices 150, 160 can communicate with the monitor control unit 110 using various local wireless protocols, such as Wi-Fi, Bluetooth, Z-Wave, ZigBee, HomePlug (Ethernet over powerline), or wired protocols such as Ethernet, USB, and other wired protocols based on the RS232, RS485, and/or RS422 standards. The one or more mobile devices 150, 160 can connect locally to the control system and its sensors 120 and other devices. The local connection can improve the speed of communications because communicating through the network 105 with a remote server, e.g., the application server 170, can be slower.

Although the one or more mobile devices 150, 160 are shown communicating with the monitor control unit 110, the one or more mobile devices 150, 160 can communicate directly with the sensors 120 and other devices controlled by the monitor control unit 110. In some implementations, the one or more mobile devices 150, 160 replace the monitor control unit 110 and perform the functions of the monitor control unit 110 for local control and long range or offsite communication.

In other implementations, the one or more mobile devices 150, 160 receive control system data captured by the monitor control unit 110 through the network 105. The one or more mobile devices 150, 160 can receive the data from the monitor control unit 110 through the network 105 or the application server 170 and can relay data received from the monitor control unit 110 to the one or more mobile devices 150, 160 through the network 105. In this regard, the application server 170 can facilitate communications between the one or more mobile devices 150, 160 and the monitor control unit 110.

Although the one or more mobile devices 150, 160 are shown in FIG. 1 as being connected to the network 105, in some implementations, the one or more mobile devices 150, 160 are not connected to the network 105. In these implementations, the one or more mobile devices 150, 160 communicate directly with one or more of the control system components and no network connection, e.g., connection to the Internet, or reliance on remote servers is needed.

In some implementations the one or more mobile devices 150, 160 are used in conjunction with only local sensors and/or local devices at a property. In these implementations, the system 100 only includes the one or more mobile devices 150, 160 and the modules 122, 124, 126, 128, and 132. The one or more mobile devices 150, 160 can receive data directly from the modules 122, 124, 126, 128, and 132 and send data directly to the modules 122, 124, 126, 128, and 132. The one or more mobile devices 150, 160 provide the appropriate interfaces/processing to provide control information, modify settings, control the thermostat, control HVAC system component operations, etc. In some implementations, the one or more mobile devices 150, 160 communicate directly with only the sensors 120, the thermostat 130, and the HVAC system 140 without the use of the monitor control unit 110.

In some implementations, a mobile device 150, 160 is able to determine a geographic location associated with the mobile device 150, 160, and can communicate information identifying a geographic location associated with the mobile device 150, 160. For example, a mobile device 150, 160 can determine the current geographic location of the mobile device 150, 160 by using global positioning system (GPS) capabilities. In other implementations, a geographic location associated with a mobiles device 150, 160 can be determined using other methods, for example, by using Wi-Fi access point triangulation data, cellular network triangulation data, or IP address information, when the mobile device 150, 160 has network connectivity. The mobile device 150, 160 can transmit data identifying the geographic location of the mobile device 150, 160 over the network 105 to the application server 170, or to the monitor control unit 110.

The one or more mobile devices 150, 160 can each include a native application 152, 162, respectively. The native application 152, 162 refers to a software/firmware program running on the corresponding mobile devices that enables the features below. The one or more mobile devices 150, 160 can load or install the native application 152, 162 based on data received over a network or data received from local media. The native monitoring application 152, 162 can run on mobile devices' platforms, such as Apple iOS, iPhone, iPod touch, Blackberry, Google Android, Windows Mobile, etc.

The native application identifies a geographic location associated with the mobile device 150, 160 and communicates information identifying the geographic location. For example, a mobile device 150, 160 having the native application 152, 162 can determine a geographic location of the mobile device 150, 160 using GPS capabilities, and can communicate data identifying the geographic location to the application server 170. In some instances, the native application 152, 162 can check the location of the mobile device 150, 160 periodically and can automatically detect when a user associated with the mobile device 150, 160 is going toward or away from a property.

The application server 170 is an electronic device configured to provide control services by exchanging electronic communications with the monitor control unit 110 and the one or more mobile devices 150, 160 over the network 105. For example, the application server 170 can be configured to monitor data obtained by the monitor control unit 110. In this example, the application server 170 can exchange electronic communications with the network module 114 included in the monitor control unit 110 to send and/or receive information regarding activity at the property and/or the environment at the property. The application server 170 also can receive information regarding activity within or external to the property from the one or more mobile devices 150, 160. For example, the application server 170 can receive information from the one or more mobile devices 150, 160 that indicates the locations of the one or more mobile devices 150, 160.

In some implementations, the application server 170 has access to weather data and/or weather forecast data, where the weather and/or weather forecast data can be used to perform dynamic environmental control within the property. For example, the application server 170 can be connected to the Internet over the network 105 and can access the weather and/or weather forecast data at a website or database that is accessible on the Internet. The weather data can include current weather data, such as a current temperature, humidity, dew point, wind chill, heat index, etc., and the weather forecast data can include short and long term weather forecasts, for example, short and long term temperature forecasts, precipitation forecasts, etc.

The application server 170 can store data, e.g., activity, environmental, and/or weather data, received from the monitor control unit 110, the mobile devices 150, 160, and/or the Internet, and can perform analysis of the stored data. Based on the analysis, the application server 170 can communicate with and control aspects of the monitor control unit 110.

In some implementations, the HVAC performance model may be generated based on a data aggregation framework that obtains data from a set of distributed sources. HVAC performance data can be obtained from the HVAC system 140 and compared with manufacturer information, historical weather information can be obtained from third party weather forecasting organization, and pricing data can be obtained from energy suppliers/providers for a particular geographic region where the property is located.

In some implementations, the system 100 enables dynamic environmental control within the property by analyzing aggregate data of user activity data, environmental data, and/or weather data, and controlling the operations of the thermostat 130 and/or the HVAC system 140 based on the analysis. For example, the monitor control unit 110 can enable the dynamic control of temperature within a home based on the aggregate data. As described more particularly with respect to FIG. 2, the aggregate data may be an HVAC performance model that estimates energy consumption by the HVAC system 140 based on the interior temperature of the property, the exterior temperature of the property, and historical HVAC performance information.

In some examples, activity data includes data indicating the activity of users within a property as well as data indicating the activity of users external to a property. User activity within a property can be detected by the sensors 120 associated with the property, such as one or more motion, contact, noise or other sensors capable of detecting user activity in specific parts of the property. For example, a property can be equipped with a motion sensor in each room of the property, and the monitor control unit 110 can determine whether users are located in particular rooms of the property based on data from the motion sensors. In some instances, user activity external to a property is achieved by tracking the locations of mobile devices 150, 160 associated with users of the property. For example, the GPS coordinates of a user's mobile device (e.g., the user devices 150, 160) can be tracked over time and analyzed to determine control of the HVAC system 140. In some instances, tracking a user's mobile device can be used to determine whether the user is leaving or about to arrive at the property, and the fact that the user is leaving or about to arrive can be used to control the HVAC system 140 accordingly.

Figure 2:
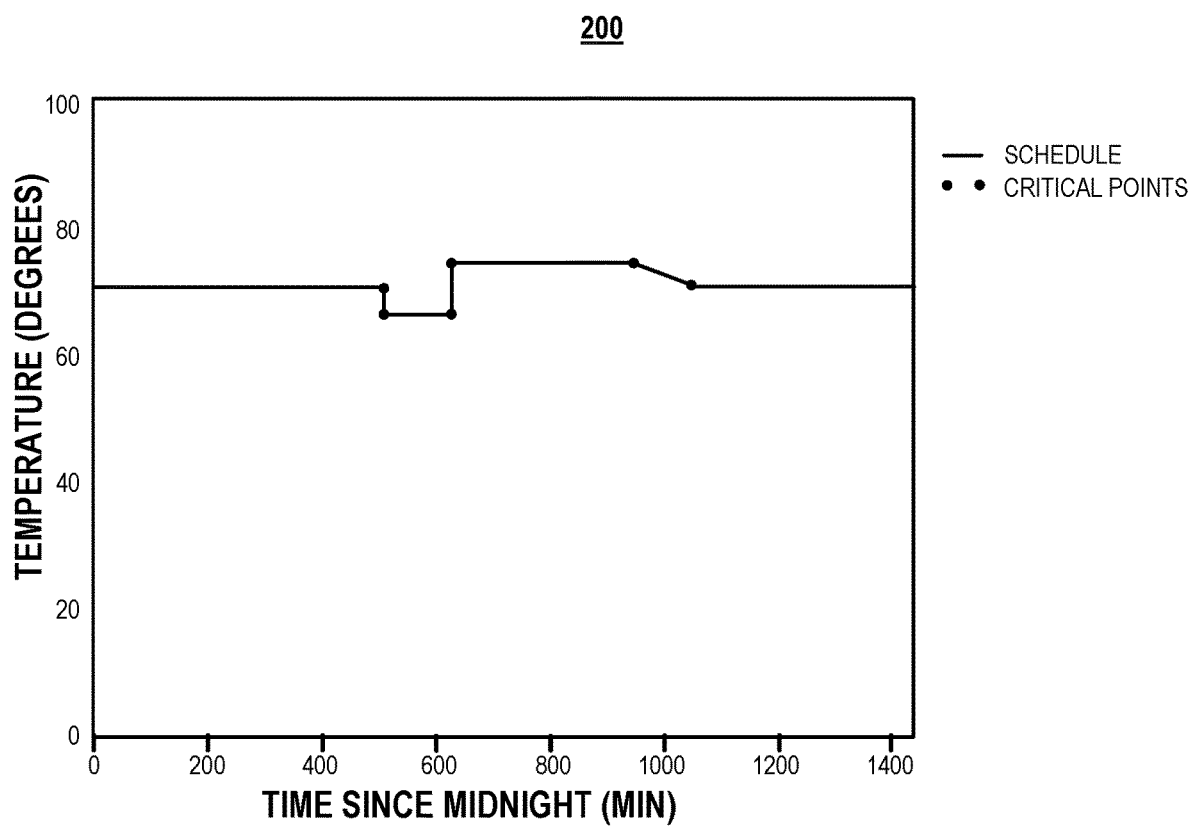
FIG. 2 illustrates a diagram of an example of a general schedule template.

FIG. 2 illustrates a diagram of an example of a general schedule template 200. As depicted, the template 200 includes adjustable points that are used to generate a variety of schedules that can be used in to modulate a set point temperature of the HVAC system 140 in different circumstances based on factors associated with performance of the HVAC system 140. For instance, as depicted in the schedule templates of FIGS. 2-6, the adjustable points can be shifted along the horizontal and vertical axes such that the set point temperature of the thermostat 130 can be adjusted with respect to a time of day.

Figure 5A:
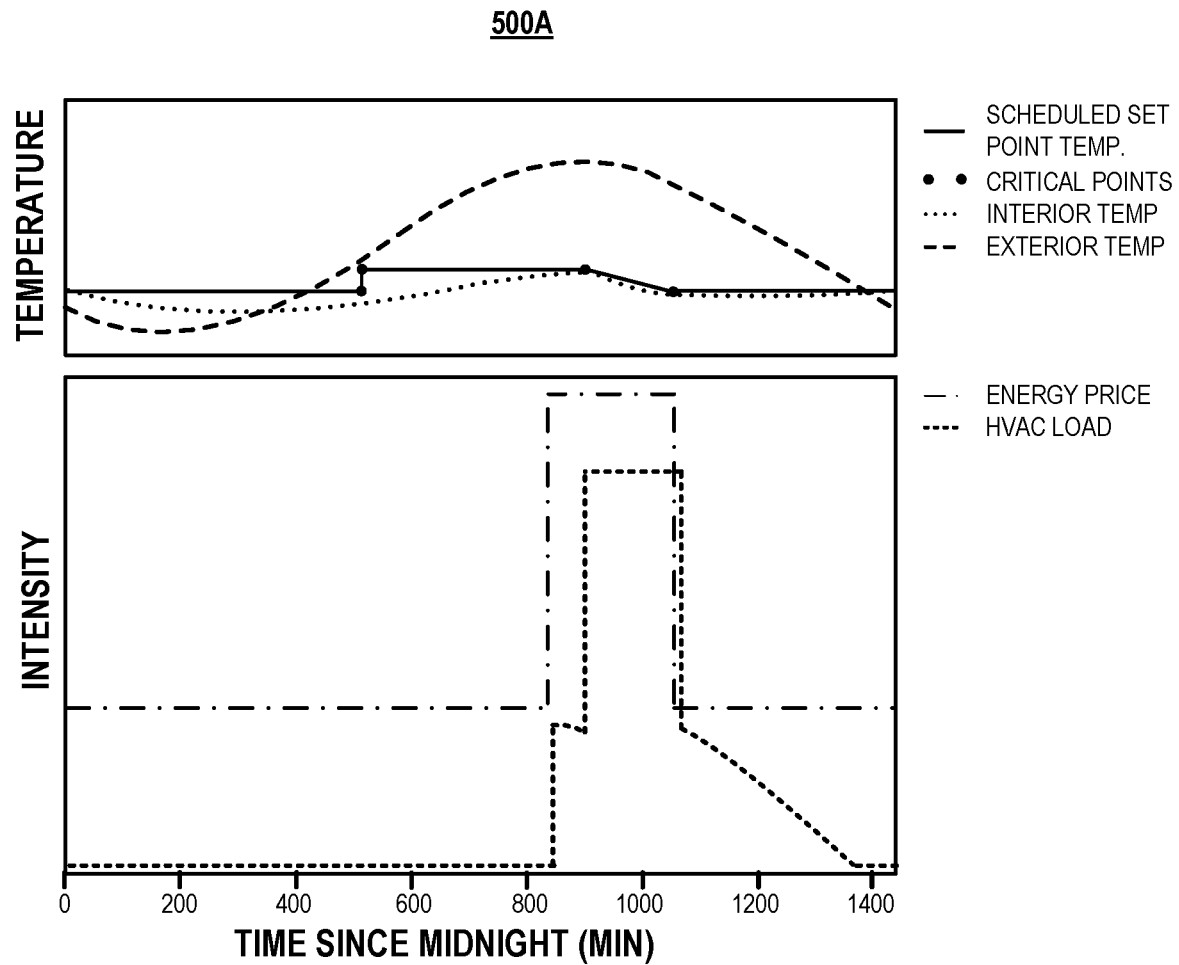
FIG. 5A illustrates a diagram of an example of an optimally comfortable schedule template with peak pricing for energy tariffs.
Figure 5B:
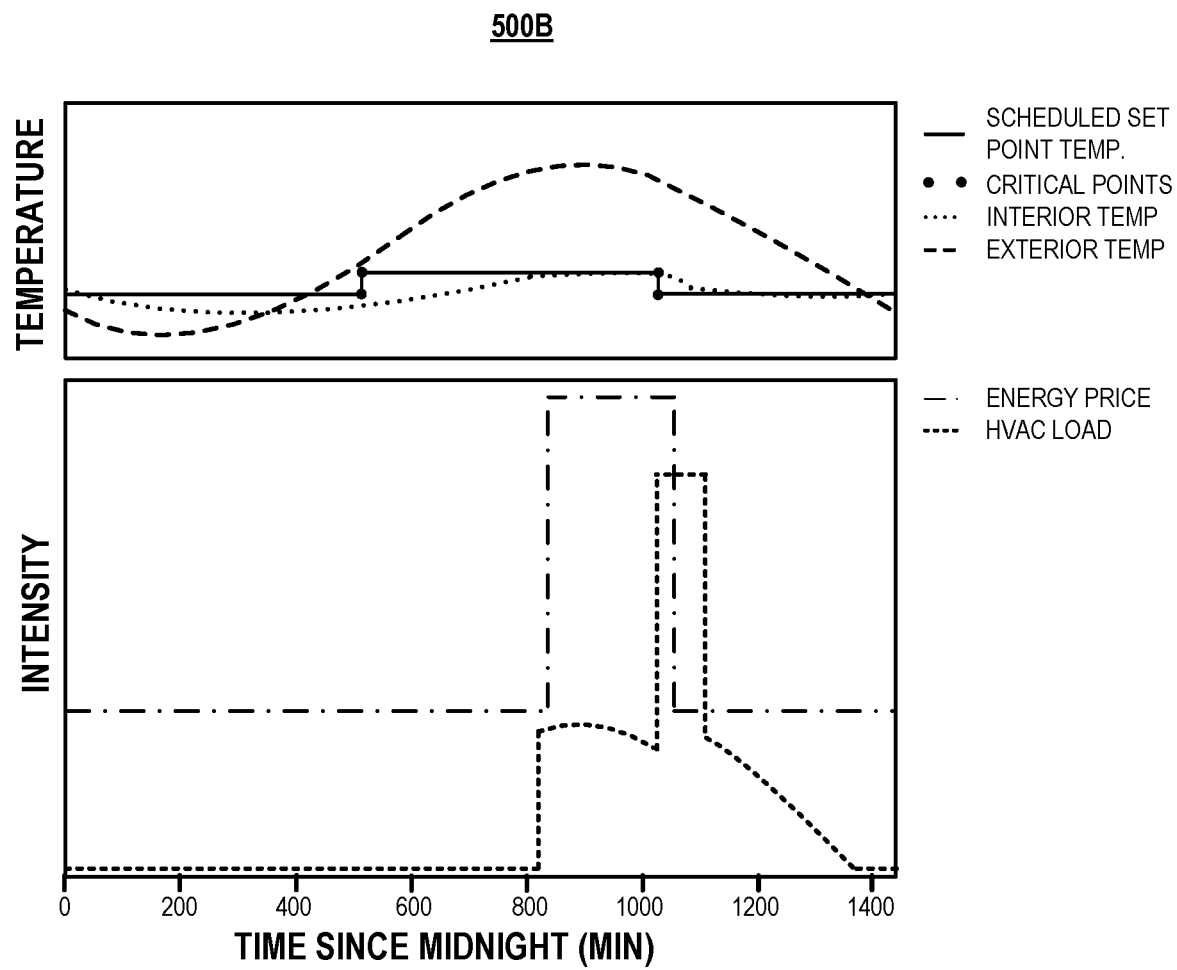
FIG. 5B illustrates a diagram of an example of an optimally cost efficient schedule template with peak pricing for energy tariffs.
Figure 6:
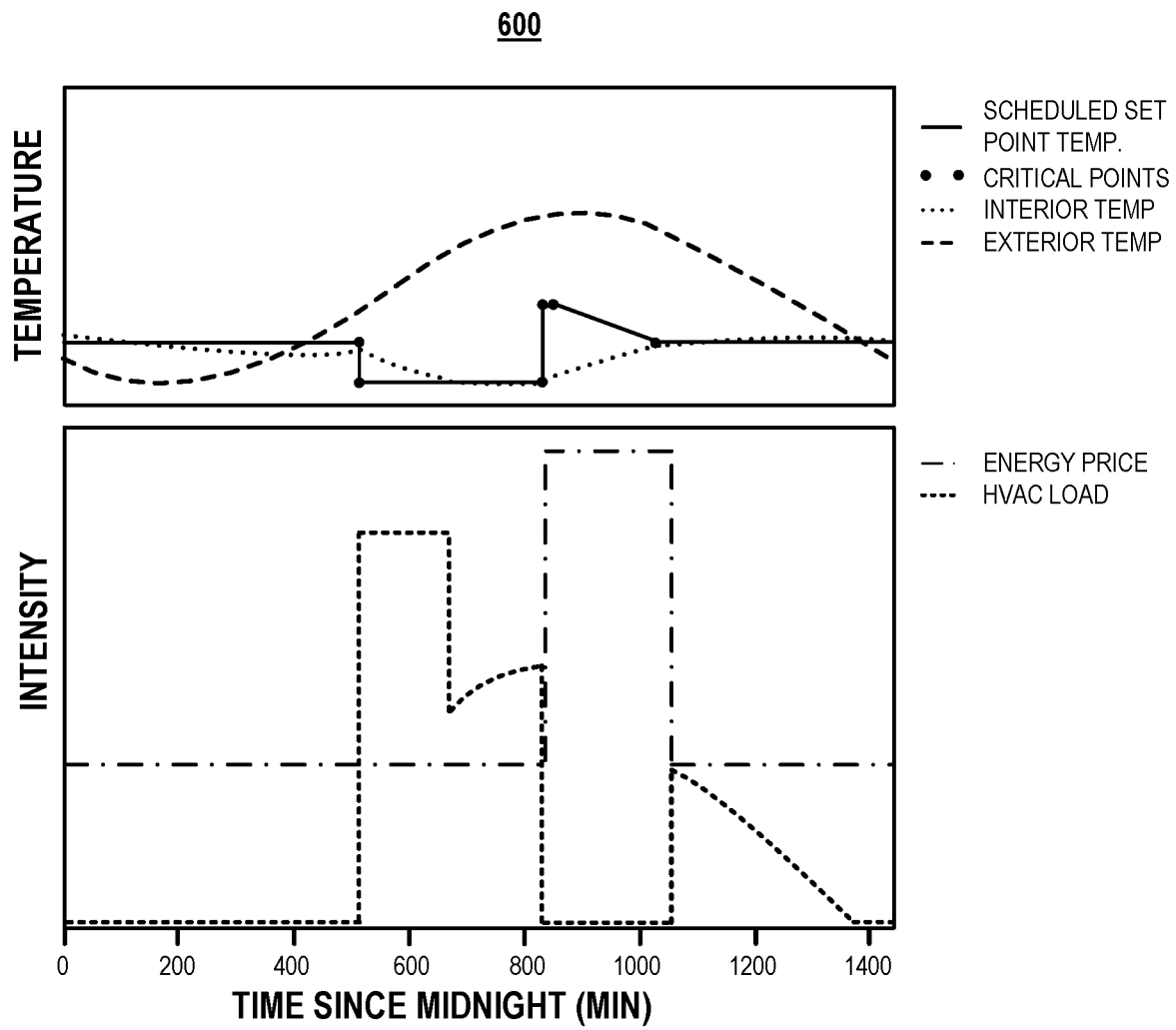
FIG. 6 illustrates a diagram of an example of a personalized schedule template that is balanced between comfort and energy efficiency with peak pricing for energy tariffs.

In the example, six adjustable points are arranged such that the set point temperature is initially set to 70 degrees Fahrenheit, reduced to 63 degrees Fahrenheit around 500 minutes after midnight, increased to 78 degrees around 600 minutes after midnight, followed by a gradual decrease to 70 degrees from 980 to 1020 minutes after midnight. As described below, the general schedule template can be adjusted based on a variety of factors to accommodate either maximum user comfort (e.g., FIGS. 3A, 5A) or maximum energy efficiency (e.g., FIG. 3B, 5B) or a combination of both (e.g., FIGS. 4, 6). In addition, as depicted in FIGS. 5A, 5B, and 6, the schedule templates can also be adjusted to consider energy tariffs during peak pricing periods.

Figure 3A:
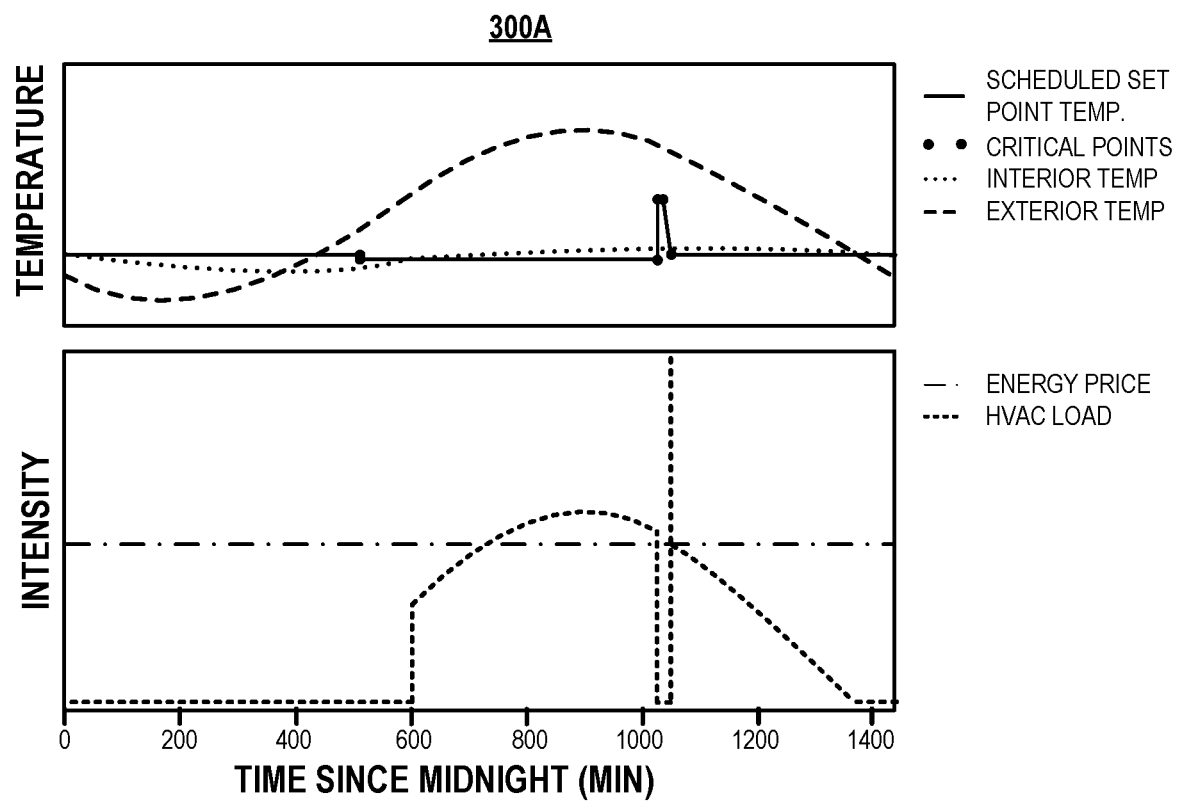
FIG. 3A illustrates a diagram of an example of an optimally comfortable schedule template with a flat energy tariff rate.

FIG. 3A illustrates a diagram of an example of an optimally comfortable schedule template 300A with a flat energy tariff rate. As depicted in FIG. 3A, exterior and interior temperature may be measured by the sensors 120 within the property (e.g., an interior temperature and an exterior temperature), and the detected temperatures may be represented with respect to time. In addition, the HVAC performance model may be used to estimate a HVAC load that is depicted as a change in intensity of operation of the HVAC system 140 throughout the day. In this instance, the intensity of operation correlates with energy consumption by the HVAC system 140 in maintaining the set point temperature indicated by the template 300A.

In the example, the template 300A maintains a substantively constant interior temperature by specifying relatively minor changes to the set point temperature, consistent with a user-defined desired temperature on the thermostat 130, to prevent changes in exterior throughout the day from impacting the temperature felt by the user within the property. This is represented by a relatively flat schedule throughout the day even with significant changes to the exterior temperature starting from 500 minutes after midnight. In this example, although the user's comfort settings are increased, the HVAC system 140 also consumes significant energy in maintaining the designated set point temperature. This is represented by significant HVAC load between 600 to 1380 minutes after midnight. Under this approach, a user may come home at any time and the interior temperature will be close to the user's desired temperature.

Figure 3B:
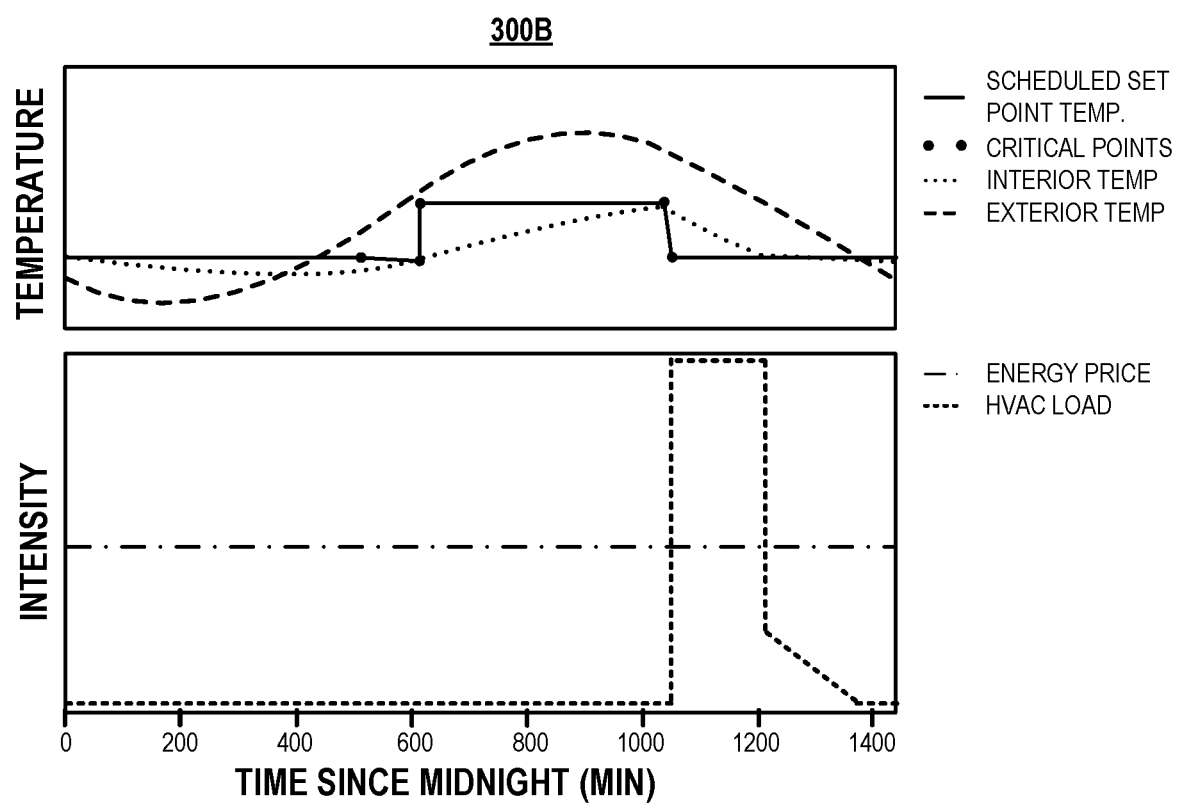
FIG. 3B illustrates a diagram of an example of an optimally cost efficient schedule template with a flat energy tariff rate.

FIG. 3B illustrates a diagram of an example of an optimally cost efficient schedule template 300B with a flat energy tariff rate. Compared to the template 300A, the template 300B prioritizes energy efficiency at the expense of a reduced user comfort level. For instance, to accommodate for the increased exterior temperature, the template 300B specifies a schedule that increases the set point temperature between 600 minutes to 1050 minutes after midnight to reduce the corresponding HVAC load during this time period. In this example, HVAC load is reduced significantly prior to 1050 minutes after midnight, which leads to higher energy efficiency. However, to counteract the reduced energy consumption, the user's comfort level is adversely impacted since the set point temperature must be raise to a level higher than a user's specified comfort setting. The schedule template may schedule the increase in the set point temperature above a user's desired temperature during times when the user is not home, e.g., during standard work hours between 600 minutes after midnight to 1050 minutes after midnight. However, as shown, at 1050 minutes after midnight the interior temperature is still higher than a user's desired temperature.

Figure 4:
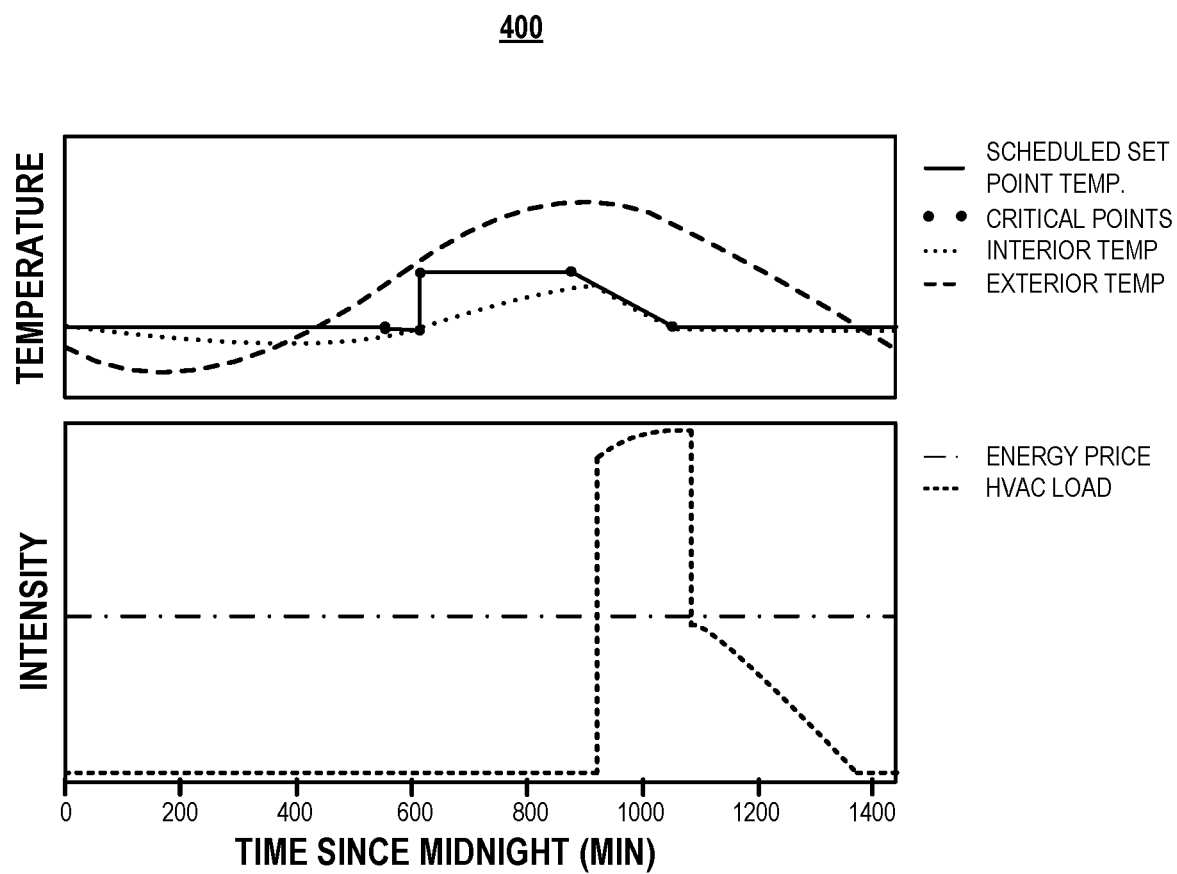
FIG. 4 illustrates a diagram of an example of an optimal schedule template for a balance between comfort and energy efficiency with a flat energy tariff rate.

FIG. 4 illustrates a diagram of an example of an optimal schedule template 400 for a balance between comfort and energy efficiency with a flat energy tariff rate. Compared to templates 300A and 300B, the template 400 compromises between user comfort level and energy efficiency. For instance, instead of specifying a schedule that increases the set point temperature for the entire period between 600 minutes to 1050 minutes after midnight as specified by template 300B, the set point temperature gradually decreases from 900 to 1050 minutes to reduce impact of the temperature difference in user comfort level. This also leads to an increase in HVAC load compared to the template 300B, but less than the HVAC load compared to the template 300A. However, when the user returns home at 1050 minutes after midnight the interior temperature will be the user's desired temperature.

FIG. 5A illustrates a diagram of an example of an optimally comfortable schedule template with peak pricing for energy tariffs. Compared to the template 500B, the template 500A specifies a schedule that gradual decreases the set point temperature during the time period specified by 850 to 1050 minutes after midnight in order to improve user comfort level as a result of the increased set point temperature. As a consequence, compared to the template 500B, the HVAC load is increased within the peak pricing period. In this example, the energy tariff imposes a significantly high cost associated with HVAC operation to maintain the user comfort level by keeping the interior temperature closer to the user's desired temperature.

FIG. 5B illustrates a diagram of an example of an optimally cost efficient schedule template 500B with peak pricing for energy tariffs. As depicted in FIG. 5B, the peak pricing period between 800 to 1050 minutes after midnight creates a premium energy tariff associated with energy consumption by the HVAC system 140 during that period. As such, during this period, energy consumption leads to greater overall costs associated with HVAC operation. In this example, the schedule specifies a modest increase in the set point temperature between the time period specified by 550 to 1050 minutes after midnight to minimally operate the HVAC system 140 during the peak energy pricing period to reduce overall cost associated with HVAC operation. For example, HVAC load is increased to full intensity from 1000 to 1150 minutes after midnight in order to reduce energy costs during the peak pricing period while also reducing the change in the set point temperature to maintain user comfort level by having the interior temperature close to the user's desired temperature but not as close as FIG. 5A.

FIG. 6 illustrates a diagram of an example of a personalized schedule template 600 that is balanced between comfort and energy efficiency with peak pricing for energy tariffs. Compared to templates 500A and 500B, the template 600 specifies a schedule that includes a pre-cooling period during the time period between 500 to 850 minutes after midnight prior to the peak pricing period in order to accommodate the increasing exterior temperature. In this regard, the pre-cooling period ensures that HVAC load is the highest during a period where energy tariff is at a minimal level to prevent incurring significant energy usage costs associated with HVAC operation during the peak pricing period. In addition, after the pre-cooling period, the template 600 also specifies a schedule that gradually decreases the set point temperature during the peak pricing period to maintain the user comfort level after the pre-cooling period. In this regard, the template 600 can be used to both sufficiently maintain user comfort level throughout the entire time period while also reducing costs associated with energy usage during the peak pricing period by lowering HVAC load during this time period. Thus, compared to the templates 300A, 300B, 400, 500A, and 500B, the template 600 may not only more amenable to the user comfort level, but also more cost efficient.

Figure 7:
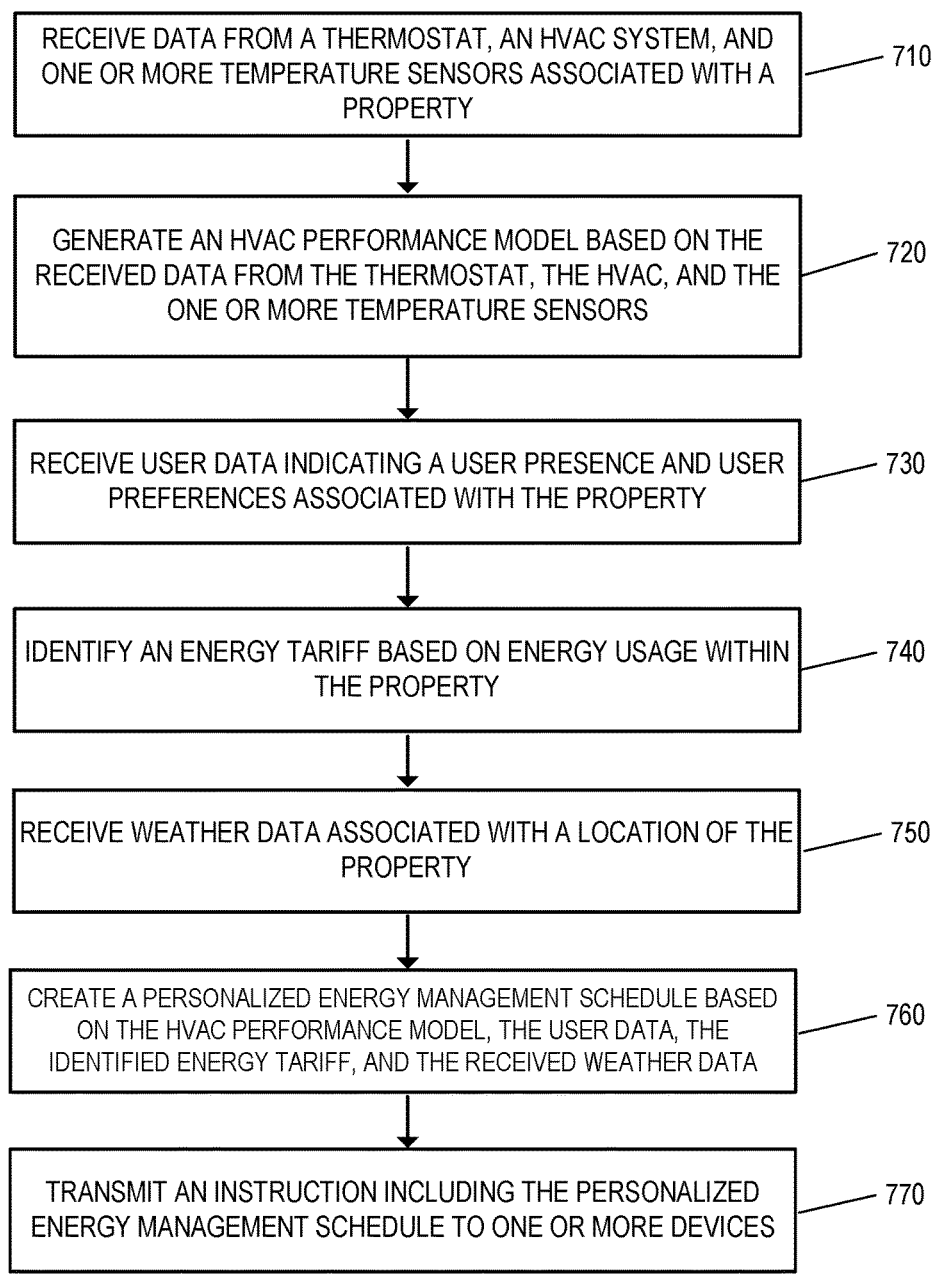
FIG. 7 illustrates an example of a process for generating personalized energy management schedules.

FIG. 7 illustrates an example of a process 700 for generating personalized energy management schedules. Briefly, the process 700 may include receiving data from a thermostat, an HVAC, and one or more temperature sensors associated with a property (710), generating an HVAC performance model based on the received data from the thermostat, the HVAC, and the one or more temperature sensors (720), receiving user data indicating a user presence and user preferences associated with the property (730), identifying an energy tariff based on energy usage within the property (740), receiving weather data associated with a location of the property (750), creating a personalized thermostat schedule based on the HVAC performance model, the user data, identified energy tariff, and the received weather data (760), and transmitting an instruction including the personalized thermostat schedule to one or more devices (770).

In more detail, the process 700 may include the process 700 may include receiving data from a thermostat, an HVAC, and one or more temperature sensors associated with a property (710). For instance, the monitor control unit 110 may receive data from the thermostat 130, the HVAC system 140, and one or more temperature sensors of the sensors 120 within the property. The data from the thermostat 130 includes a user-defined desired temperature that indicates a preference for a particular interior temperature of the property. The data from the HVAC system 140 can include previous and current HVAC load, energy consumption data and/or other types of data collected by components of the HVAC system 140. In addition, the data from the one or more temperature sensors may include a presently detected interior temperature within the property and a presently detected exterior temperature outside the property.

The process 700 may include generating an HVAC performance model based on the received data from the thermostat, the HVAC, and the one or more temperature sensors (720). For instance, the monitor control unit 110 may use pattern recognition techniques on historical HVAC performance data in order to generate the HVAC performance model. As described previously, in some implementations, the HVAC performance model may be a linear model that approximates subsequent HVAC performance given a set of parameters that impact HVAC operation. For example, the parameters may include an interior temperature, an exterior temperature, or a set point temperature.

The process 700 may include receiving user data indicating a user presence and user preferences associated with the property (730). For instance, the monitor control unit 110 may receive user presence data from one or more sensors 120 that are occupancy sensors indicating that whether the property is presently occupied by one or more users, and if the property is occupied, a location within the property associated with the one or more users. In addition, data indicating the set of user preferences may include prior adjustments to desired temperatures within the property, user indications of comfort settings (e.g., warmer temperatures in the mornings, etc.), or other types of user input data that indicate specific configurations or settings associated with HVAC operation.

In some implementations, the user data may also include predicted occupancy based on historical data associated with user presence. For instance, the monitor control unit 110 may initially aggregate historical occupancy data over a particular time period (e.g., six months) and then use pattern recognition techniques to identify time periods where the user is frequently present within the property (e.g., night time, weekends, etc.). In such instances, the predictions for future occupancy can be used in addition to current presence data to generate the personalized energy management schedules. For example, if a prediction indicates that a user is unlikely to be present within the property for a time period, the monitor control unit 110 may allow the interior temperature to change more from the user's desired temperature during that time period to increase energy efficiency.

The process 700 may include identifying an energy tariff based on energy usage within the property (740). For instance, the monitor control unit 110 may identify an energy tariff associated with a peak pricing period based on the energy provider that provides energy services to the property. In some examples, the energy tariff may be a flat value that does not change with respect to time. In such instances, the energy cost resulting from HVAC operation remains constant regardless of the time of operation. Alternatively, in other examples, the energy tariff may increase during peak pricing periods where the energy provider charges a premium for energy consumption. In these instances, the energy consumption resulting from HVAC operation leads to greater costs if the HVAC operation takes place within the peak pricing periods.

The process 700 may include receiving weather data associated with a location of the property (750). For instance, the monitor control unit 110 may receive weather data that includes a predicted forecast associated with a location of the property. In some examples, the weather data may be received from a third party weather reporting organization over the Internet using the network 105. In other examples, the weather data may be transmitted by an organization that provides monitoring services associated with the system 100 to the property. In such examples, the monitor control unit 110 may be configured to periodically receive weather forecasts associated with the location from the application server 170.

The process 700 may include creating a personalized energy management schedule based on the HVAC performance model, the user data, and identified energy tariff, and the received weather data (760). For instance, as described with respect to FIGS. 2-6, the monitor control unit 110 may create a personalized energy management schedule based on a variety of different factors. For example, the factors may include information included within the generated HVAC performance model and the identified energy tariff using a set of schedule templates that specify changes in set point temperatures over a particular time period in relation to the exterior temperature of the property, the interior temperature of the property, the predicted HVAC load, the identified energy tariff, or user preferences for energy efficiency or user comfort. In some instances, the personalized energy management schedule may be configured to increase user comfort at the cost of increased energy consumption (e.g., templates 300A and 500B). Alternatively, in other instances, the personalized energy management schedule may be configured to reduce energy consumption and costs associated with HVAC operation (e.g., templates 300B and 500A). In other instances, the personalized energy management schedule may be configured to balance both user comfort against costs associated with HVAC operation (e.g., templates 400 and 600). In each of these instances, the particular personalized energy management schedule used by the monitor control unit 110 to adjust HVAC operation may be based on user preferences and/or other considerations related to the property.

In some implementations, selection of the most appropriate personalized energy management schedule may be dynamic and adjustable based on the current circumstances surrounding the property. For example, personalized energy management schedules that prioritize energy conservation (e.g., templates 300B and 500A) may be more likely to be selected during days when the user's schedule is more predictable so that the user is not home during interior temperature variations or when the user is feeling less sensitive to interior temperature variations. In another example, personalized energy management schedules that prioritize user comfort (e.g., templates 300A and 500B) may be more likely to be selected during days when the user's schedule is less predictable or when the user is feeling more sensitive to temperature variations. In yet another example, selection of the personalized energy management schedule may be based on the location of the property and particular environmental susceptibilities that impact HVAC operation.

The process 700 may include transmitting an instruction including the personalized energy management schedule to one or more devices (770). For instance, the monitor control unit 110 can transmit an instruction to adjust the operation of the HVAC system 140 according to the personalized energy management schedule. In some examples, the instruction can specify time periods to turn the HVAC system 140 on or off based on the predicted HVAC load during the specified time periods. In some implementations, the instruction can additionally or alternatively be sent to other peripheral devices within the property whose operation can have an impact on the HVAC load. For example, the instruction can be sent to devices attached to electronic devices attached to windows, doors, or other exterior portions of the property. In this example, during a heating operation, the instruction can specify that the electronic devices be configured to prevent air from entering into the property to reduce the amount of energy consumption needed to increase the interior temperature of the property relative to the exterior temperature of the property. In another example, the monitor control unit 110 may transmit instructions to a thermostat to modify a set point to match a schedule each time the set point changes according to a schedule, and the thermostat and HVAC may then determine the load to place on the HVAC based on the difference between the set point and a current interior temperature.

The described systems, methods, and techniques may be implemented in digital electronic circuitry, computer hardware, firmware, software, or in combinations of these elements. Apparatus implementing these techniques may include appropriate input and output devices, a computer processor, and a computer program product tangibly embodied in a machine-readable storage device for execution by a programmable processor. A process implementing these techniques may be performed by a programmable processor executing a program of instructions to perform desired functions by operating on input data and generating appropriate output. The techniques may be implemented in one or more computer programs that are executable on a programmable system including at least one programmable processor coupled to receive data and instructions from, and to transmit data and instructions to, a data storage system, at least one input device, and at least one output device. Each computer program may be implemented in a high-level procedural or object-oriented programming language, or in assembly or machine language if desired; and in any case, the language may be a compiled or interpreted language. Suitable processors include, by way of example, both general and special purpose microprocessors. Generally, a processor will receive instructions and data from a read-only memory and/or a random access memory. Storage devices suitable for tangibly embodying computer program instructions and data include all forms of non-volatile memory, including by way of example semiconductor memory devices, such as Erasable Programmable Read-Only Memory (EPROM), Electrically Erasable Programmable Read-Only Memory (EEPROM), and flash memory devices; magnetic disks such as internal hard disks and removable disks; magneto-optical disks; and Compact Disc Read-Only Memory (CD-ROM). Any of the foregoing may be supplemented by, or incorporated in, specially designed application-specific integrated circuits (ASICs).

It will be understood that various modifications may be made. For example, other useful implementations could be achieved if steps of the disclosed techniques were performed in a different order and/or if components in the disclosed systems were combined in a different manner and/or replaced or supplemented by other components. Accordingly, other implementations are within the scope of the disclosure.

What is claimed is:

1. A monitoring system that is configured to monitor a property, the monitoring system comprising:
   a motion sensor that is configured to generate motion sensor data in response to detecting movement in a vicinity of the motion sensor;
   a temperature sensor that is configured to generate temperature sensor data that reflects an ambient temperature of the temperature sensor;
   an electronic device that is configured to open and close an access point to the property;
   a thermostat that is configured to control an HVAC system that provides conditioned air to the property; and
   a monitor control unit that is configured to:
      receive, from the temperature sensor, the temperature sensor data;
      receive, from the thermostat, thermostat data that indicates temperature settings of the thermostat;
      receive, from the HVAC system, HVAC data that indicates past operational loads of the HVAC system;
      based on the temperature sensor data, the thermostat data, and the HVAC data, generate an HVAC performance model that estimates HVAC performance for given temperature sensor data and given thermostat data;
      receive, from the motion sensor, the motion sensor data;
      receive, from a user, user preferences that reflect a temperature preference for the property;
      determine an energy tariff rate based on an energy cost during one or more periods of time during a day;
      receive weather data for a location of the property;
      receive, from the electronic device, access point data that indicates whether the access point is opened or closed;
      based on the HVAC performance model, the motion sensor data, the user preferences, the energy tariff rate that is based on the energy cost during the one or more periods of time during the day, and the weather data, generate an operating schedule of the HVAC system and an open-close schedule for the access point;
      provide, to the thermostat device, the operating schedule of the HVAC system; and
      provide, to the electronic device, the open-close schedule for the access point.

2. The monitoring system of claim 1, wherein the monitor control unit is configured to:
   receive the HVAC data that indicates the past operational loads of the HVAC system by receiving the HVAC data that indicates the past operational loads of the HVAC system and past energy consumption of the HVAC system; and
   generate the HVAC performance model that estimates HVAC performance for given temperature sensor data and given thermostat data by generating, based on the temperature sensor data, the thermostat data, and the HVAC data that indicates the past operational loads of the HVAC system and the past energy consumption of the HVAC system, the HVAC performance model that estimates HVAC performance for given temperature sensor data and given thermostat data.

3. The monitoring system of claim 1, wherein:
   the temperature sensor is an indoor temperature sensor that is configured to generate indoor temperature sensor data that reflects an indoor temperature of the property;
   the monitoring system comprises an outdoor temperature sensor that is configured to generate outdoor temperature sensor data that reflects an outdoor temperature of the property;
   the monitor control unit is configured to generate the HVAC performance model that estimates HVAC performance for given temperature sensor data and given thermostat data by generating, based on the indoor temperature sensor data, the outdoor temperature sensor data, the thermostat data, and the HVAC data, the HVAC performance model that estimates HVAC performance for given indoor temperature sensor data, given outdoor temperature sensor data, and given thermostat data.

4. The monitoring system of claim 1, wherein the HVAC performance model is a linear model that approximates subsequent HVAC performance based on the given temperature sensor data and the given thermostat data.

5. The monitoring system of claim 1, wherein the monitor control unit is configured to:
   determine an occupancy of the property and a location of the occupancy based on the motion sensor data and a location of the motion sensor; and
   generate an operating schedule of the HVAC system and an open-close schedule for the access point by generating the operating schedule of the HVAC system and the open-close schedule for the access point based on the HVAC performance model, the occupancy of the property, the location of the occupancy of the property, the user preferences, the energy tariff rate that is based on the energy cost during the one or more periods of time during the day, and the weather data.

6. The monitoring system of claim 1, wherein the monitor control unit is configured to:
   determine occupancy prediction data and occupancy location prediction data based on historical motion sensor data and the location of the motion sensor; and
   generate an operating schedule of the HVAC system and an open-close schedule for the access point by generating the operating schedule of the HVAC system and the open-close schedule for the access point based on the HVAC performance model, the occupancy prediction data of the property, the occupancy location prediction data, the user preferences, the energy tariff rate that is based on the energy cost during the one or more periods of time during the day, and the weather data.

7. The monitoring system of claim 6, wherein the monitor control unit is configured to:
increase an energy efficiency of the operating schedule of the HVAC system based on the occupancy prediction data of the property indicating an increased confidence that the property will be occupied during performance of the operating schedule of the HVAC system; and
decrease an energy efficiency of the operating schedule of the HVAC system based on the occupancy prediction data of the property indicating a decreased confidence that the property will be occupied during performance of the operating schedule of the HVAC system.

8. The monitoring system of claim 1, wherein:
the operating schedule of the HVAC system and the open-close schedule for the access point are configured to minimize energy costs of with HVAC operation.

9. The monitoring system of claim 1, wherein:
the access point comprises a window of the property or a door of the property;
the monitor control unit is configured to:
generate an open-close schedule for the access point by generating an open-close schedule for the window of the property or the door of the property; and
provide, to the electronic device, the open-close schedule for the access point by providing, to the electronic device, the open-close schedule for the window of the property or the door of the property.

10. A computer-implemented method comprising:
receiving, from a temperature sensor of a monitoring system that is configured to monitor a property, the temperature sensor data;
receiving, from a thermostat of the monitoring system, thermostat data that indicates temperature settings of the thermostat;
receiving, from an HVAC system that provides conditioned air to the property, HVAC data that indicates past operational loads of the HVAC system;
based on the temperature data, the thermostat data, and the HVAC data, generating, by the monitoring system, an HVAC performance model that estimates HVAC performance for given temperature sensor data and given thermostat data;
receiving, from a motion sensor of the monitoring system, motion sensor data;
receiving, from a user and by the monitoring system, user preferences that reflect a temperature preference for the property;
determining, by the monitoring system, an energy tariff rate based on an energy cost during one or more periods of time during a day;
receiving, by the monitoring system, weather data for the location of the property;
receiving, from an electronic device of the monitoring system, access point data that indicates whether an access point to the property is opened or closed, wherein the electronic device is configured to open and close the access point to the property;
based on the HVAC performance model, the motion sensor data, the user preferences, the energy tariff rate that is based on the energy cost during the one or more periods of time during the day, generating, by the monitoring system, an operating schedule of the HVAC system and an open-close schedule for the access point;
providing, to the thermostat device and by the monitoring system, the operating schedule of the HVAC system; and
providing, to the electronic device and by the monitoring system, the open-close schedule for the access point.

11. The method of claim 10, wherein:
receiving the HVAC data that indicates the past operational loads of the HVAC system comprises receiving the HVAC data that indicates the past operational loads of the HVAC system and past energy consumption of the HVAC system; and
generating the HVAC performance model that estimates HVAC performance for given temperature sensor data and given thermostat data comprises generating, based on the temperature sensor data, the thermostat data, and the HVAC data that indicates the past operational loads of the HVAC system and the past energy consumption of the HVAC system, the HVAC performance model that estimates HVAC performance for given temperature sensor data and given thermostat data.

12. The method of claim 10, wherein:
the temperature sensor is an indoor temperature sensor that is configured to generate indoor temperature sensor data that reflects an indoor temperature of the property,
the method comprises receiving, from an outdoor temperature of the monitoring system, outdoor temperature sensor data that reflects an outdoor temperature of the property, and
generating the HVAC performance model that estimates HVAC performance for given temperature sensor data and given thermostat data comprises generating, based on the indoor temperature sensor data, the outdoor temperature sensor data, the thermostat data, and the HVAC data, the HVAC performance model that estimates HVAC performance for given indoor temperature sensor data, given outdoor temperature sensor data, and given thermostat data.

13. The method of claim 10, wherein the HVAC performance model is a linear model that approximates subsequent HVAC performance based on the given temperature sensor data and the given thermostat data.

14. The method of claim 10, comprising:
determining an occupancy of the property and a location of the occupancy based on the motion sensor data and a location of the motion sensor,
wherein generating an operating schedule of the HVAC system and an open-close schedule for the access point comprises generating the operating schedule of the HVAC system and the open-close schedule for the access point based on the HVAC performance model, the occupancy of the property, the location of the occupancy of the property, the user preferences, the energy tariff rate that is based on the energy cost during the one or more periods of time during the day, and the weather data.

15. The method of claim 10, comprising:
determining occupancy prediction data and occupancy location prediction data based on historical motion sensor data and the location of the motion sensor,
wherein generating an operating schedule of the HVAC system and an open-close schedule for the access point comprises generating the operating schedule of the HVAC system and the open-close schedule for the access point based on the HVAC performance model, the occupancy prediction data of the property, the occupancy location prediction data, the user preferences, the energy tariff rate that is based on the energy cost during the one or more periods of time during the day, and the weather data.

16. The method of claim 15, comprising:
increasing an energy efficiency of the operating schedule of the HVAC system based on the occupancy prediction data of the property indicating an increased confidence that the property will be occupied during performance of the operating schedule of the HVAC system; and
decreasing an energy efficiency of the operating schedule of the HVAC system based on the occupancy prediction data of the property indicating a decreased confidence that the property will be occupied during performance of the operating schedule of the HVAC system.

17. The method of claim 10, wherein:
the operating schedule of the HVAC system and the open-close schedule for the access point are configured to minimize energy costs of with HVAC operation.

18. The method of claim 10, wherein:
the access point comprises a window of the property or a door of the property,
generating an open-close schedule for the access point comprises generating an open-close schedule for the window of the property or the door of the property, and
providing, to the electronic device, the open-close schedule for the access point comprises providing, to the electronic device, the open-close schedule for the window of the property or the door of the property.

19. A non-transitory computer-readable medium storing software comprising instructions executable by one or more computers which, upon such execution, cause the one or more computers to perform operations comprising:
receiving, from a temperature sensor of a monitoring system that is configured to monitor a property, the temperature sensor data;
receiving, from a thermostat of the monitoring system, thermostat data that indicates temperature settings of the thermostat;
receiving, from an HVAC system that provides conditioned air to the property, HVAC data that indicates past operational loads of the HVAC system;
based on the temperature data, the thermostat data, and the HVAC data, generating, by the monitoring system, an HVAC performance model that estimates HVAC performance for given temperature sensor data and given thermostat data;
receiving, from a motion sensor of the monitoring system, motion sensor data;
receiving, from a user and by the monitoring system, user preferences that reflect a temperature preference for the property;
determining, by the monitoring system, an energy tariff rate based on an energy cost during one or more periods of time during a day;
receiving, by the monitoring system, weather data for the location of the property;
receiving, from an electronic device of the monitoring system, access point data that indicates whether an access point to the property is opened or closed, wherein the electronic device is configured to open and close the access point to the property;
based on the HVAC performance model, the motion sensor data, the user preferences, the energy tariff rate that is based on the energy cost during the one or more periods of time during the day, generating, by the monitoring system, an operating schedule of the HVAC system and an open-close schedule for the access point;
providing, to the thermostat device and by the monitoring system, the operating schedule of the HVAC system; and
providing, to the electronic device and by the monitoring system, the open-close schedule for the access point.

20. The medium of claim 19, wherein:
the access point comprises a window of the property or a door of the property,
generating an open-close schedule for the access point comprises generating an open-close schedule for the window of the property or the door of the property, and
providing, to the electronic device, the open-close schedule for the access point comprises providing, to the electronic device, the open-close schedule for the window of the property or the door of the property.

* * * * *